United States Patent
Troutman

(10) Patent No.: US 11,879,967 B2
(45) Date of Patent: Jan. 23, 2024

(54) RADAR FOR TRACKING OR GENERATING RADAR IMAGES OF PASSIVE OBJECTS

(71) Applicant: BlueCats Australia Pty Ltd., Sydney (AU)

(72) Inventor: Dennis Troutman, Huntsville, AL (US)

(73) Assignee: BlueCats Australia Pty Ltd., Sydney (AU)

( * ) Notice: Subject to any disclaimer, the term of this patent is extended or adjusted under 35 U.S.C. 154(b) by 494 days.

(21) Appl. No.: 17/268,474

(22) PCT Filed: Sep. 20, 2019

(86) PCT No.: PCT/IB2019/001455
§ 371 (c)(1),
(2) Date: Feb. 14, 2021

(87) PCT Pub. No.: WO2020/128640
PCT Pub. Date: Jun. 25, 2020

(65) Prior Publication Data
US 2021/0190940 A1    Jun. 24, 2021

Related U.S. Application Data

(60) Provisional application No. 62/733,908, filed on Sep. 20, 2018.

(51) Int. Cl.
*G01S 13/87* (2006.01)
*G01S 13/02* (2006.01)
*G01S 13/89* (2006.01)

(52) U.S. Cl.
CPC ........ *G01S 13/878* (2013.01); *G01S 13/0209* (2013.01); *G01S 13/89* (2013.01)

(58) Field of Classification Search
CPC .... G01S 13/878; G01S 13/0209; G01S 13/89; G01S 13/46; G01S 13/538; G01S 13/72; G01S 13/74; G01S 13/48; G01S 13/66; G01S 7/003
See application file for complete search history.

(56) References Cited

U.S. PATENT DOCUMENTS

| 9,140,772 | B1 | 9/2015 | Dewberry et al. |
| 2006/0145853 | A1 | 7/2006 | Richards |
| 2014/0253388 | A1 | 9/2014 | Jalali et al. |
| 2017/0082741 | A1 | 3/2017 | Adib et al. |
| 2018/0059231 | A1 | 3/2018 | Dewberry et al. |
| 2018/0074171 | A1* | 3/2018 | Ray ................... G01S 7/021 |
| 2020/0007310 | A1* | 1/2020 | Pavao Moreira ....... H04L 7/065 |

OTHER PUBLICATIONS

Notice of Reasons for Refusal dated Sep. 1, 2023 in related JP Patent Application No. 2021-516387, in 13 pages.

* cited by examiner

*Primary Examiner* — Marc Anthony Armand
(74) *Attorney, Agent, or Firm* — Procopio, Cory, Hargreaves & Savitch LLP

(57) ABSTRACT

An ultra wide band (UWB) based radar system and method uses reflected UWB signal pulses to locate and/or track objects having a detectable radar cross-section. The system and method use the same types of UWB transceivers used to track active RF tags and includes a method of processing channel impulse response data allowing the detection, location, and tracking of non-tagged objects within a monitored area.

14 Claims, 5 Drawing Sheets

RADAR FOR TRACKING OR GENERATING RADAR IMAGES OF PASSIVE OBJECTS

RELATED APPLICATIONS

This application is the national stage entry of PCT/IB2019/001455 filed Sep. 20, 2019, which claims priority to U.S. provisional application 62/733,908 filed Sep. 20, 2018, the contents of which are incorporated by reference.

BACKGROUND OF THE INVENTION

Field of the Invention

This disclosure relates generally to radio frequency (RF) systems and methods for tracking RF tagged objects and to radar systems and methods for tracking non-tagged objects. More specifically, the invention relates to systems and methods that can use system elements designed for tracking active, RF tagged objects to track non-tagged, or passive objects. In this context, a passive object is defined to be an object that has not been tagged with an active transmitter for the purpose of identifying or tracking the object and is capable of reflecting radio frequency (RF) pulses.

Description of Related Art

Systems for tracking objects tagged with active RF emitters are known. Such tracking systems typically include a plurality of RF transceiver devices that are distributed so as to monitor the identity, condition, presence and/or movement of RF tagged objects in a monitored area. The RF transceiver devices operate as RF receivers to receive transmissions from active tags and may also transmit information to other RF transceiver devices, including active RF tags. Examples of tagged objects being monitored may include merchandise, people, animals, parts of a production line, and tools.

Ultra wide band (UWB) positioning systems involving at least two reference transceivers to determine the positions of RF tagged objects are known. Reference transceivers of known systems are placed at fixed locations and receive signals from RF tagged objects to determine their positions relative to the reference transceivers. The distance between a given reference transceiver and the tagged object is determined from the time-of-flight of a UWB signal as the UWB signal travels in a direct line between the reference transceiver and the tagged object using various known angle-of-arrival and/or differential time-of-arrival techniques. The signals are in the form of sequenced pulses that, together, form data packets. Each pulse contains a preamble portion that contains a part of a preamble code that is distributed among the pulses of the data packet. The preamble code, which is a sequence of code symbols (−1,0,1) distributed across multiple pulses of a data packet, is used as an acquisition aid for acquiring and demodulating payloads and to establish frame timing used to synchronize with the active tag. For example, a reference RF transceiver device may utilize the channel impulse response data to determine data values for time of flight and time of arrival so as to correct non line of sight and thresholding issues between the RF tag receiver and the RF active tag. One general example of RF transceiver devices that operate in this manner are the RF transceiver devices that operate in accordance with Institute of Electrical and Electronics Engineers (IEEE) 802.15.4 standards including 2011, 2015, 2018 versions of the IEEE 802.15.4 standard.

The reference transceivers receive direct signals from one another and from tags but they also receive reflections of emitted signals that reflect off of objects within the area being monitored. One of the functions of the preamble code is to allow the identification of pulses that follow a linear path directly from the source of the pulse to the reference transceiver. No reflected signals are used for time-of-flight calculations to determine ranges and the position of the tag is determined using a combination of direct line-of-sight ranges between the emitting tag and several reference transceivers at known positions.

One limitation or disadvantage of monitoring systems and methods requiring RF tags is the inability to track or map objects that are not tagged with an RF transmitter. Another drawback is that tagging involves cost and time. In some cases, tags can be removed or become detached from their associated object, rendering the object invisible to the system. Yet another disadvantage of tag-based monitoring systems is that a person, animal, or vehicle may enter a monitored area without being tagged. Similar limitations and disadvantages apply to Radio Frequency Identification (RFID), tracking systems and methods.

BRIEF SUMMARY OF THE INVENTION

Embodiments of the present invention preferably seek to mitigate, alleviate or eliminate one or more deficiencies, disadvantages or issues in the art, such as the above-identified, singly or in any combination by providing a system, a method, and non-transitory computer-readable storage media described herein.

An advantage of the presently described UWB radar system and method is that it can use the same type of RF transceiver devices and UWB pulses as used for tracking active tags while additionally or alternatively providing the capability of tracking passive objects lacking any type of tag. One of the technical features of the presently described system and method is a computing device implementing a method that allows distinct RF reflecting objects to be located, tracked, and/or identified by measuring channel impulse response (CIR) data received by a plurality of reference transceivers. Surprisingly, the inventor has found that passive objects can be located, tracked, and/or identified in real time using reflected RF pulses despite the enormously complex vector field of UWB pulses typically reflecting off of multiple surfaces in a monitored area.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION OF EMBODIMENTS

Figure 1:
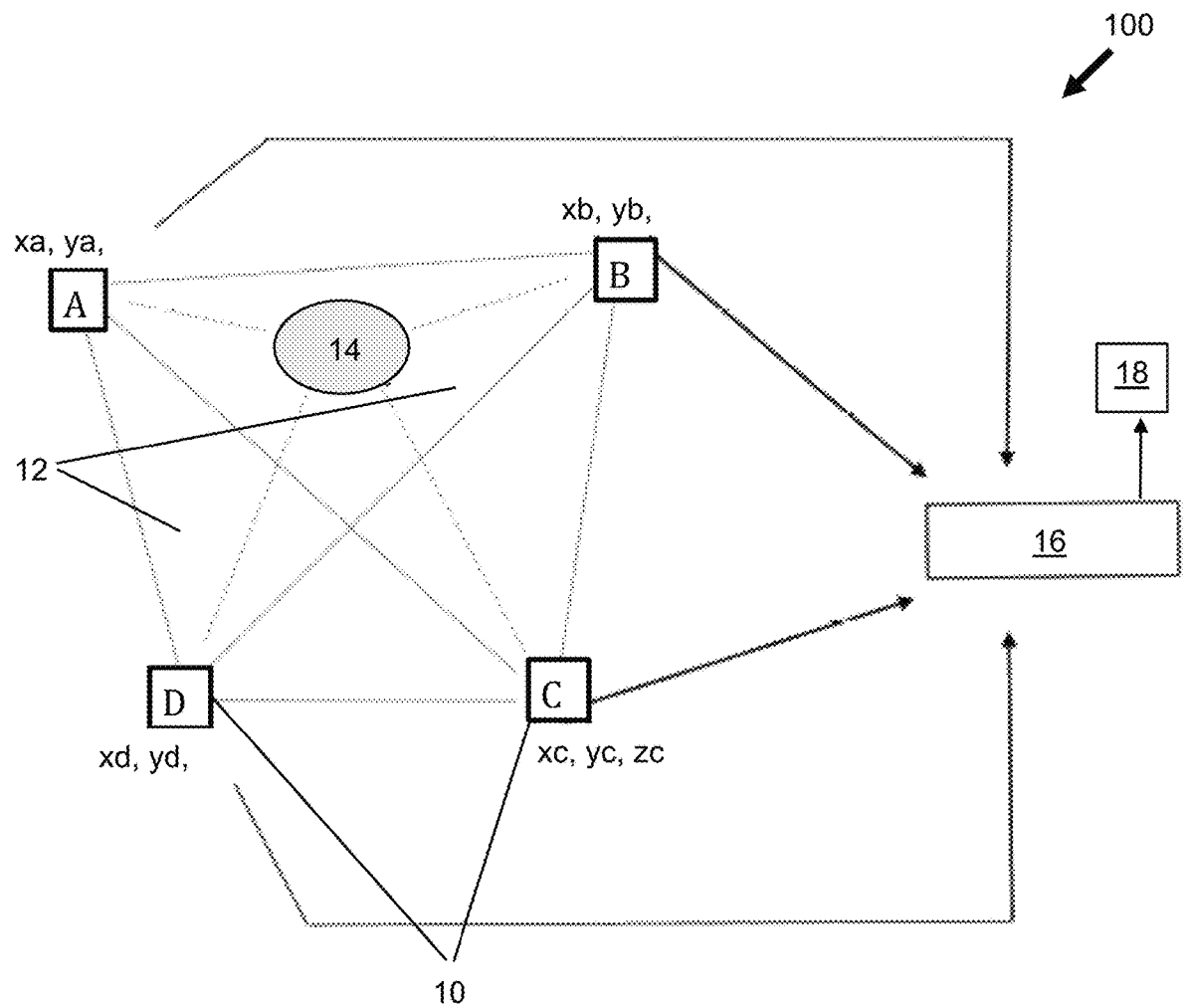
FIG. 1 illustrates one embodiment of an UWB radar system.

Specific embodiments of the invention are described with reference to the accompanying drawings. This invention may, however, be embodied in many different forms and should not be construed as limited to the embodiments set forth herein; rather, these embodiments are provided so that this disclosure is thorough and complete, and fully conveys the scope of the invention to those skilled in the art. The terminology used in the detailed description of embodiments and illustrated in the accompanying drawings is not intended to be limiting of the invention. In the drawings, like numbers refer to like elements.

The following description focuses on an embodiment of the present invention applicable to an exemplary monitored area, exemplary objects, and numbers and/or arrangements of systems components. However, it will be appreciated that the invention is not limited to the specific area, objects, and numbers/arrangements of system elements but may be applied to many other area, objects, and numbers/arrangements of system elements.

All art specific terms used herein are intended to have their art-accepted meanings in the context of the description unless otherwise indicated. All non art specific terms are intended to have their plain language meaning in the context of the description unless otherwise indicated.

As used herein, an active object is defined to be an object that has been tagged with an active RF transmitter for the purpose of identifying or tracking the object.

As used herein, a passive object is an object that is not tagged with an active RF transmitter or a radio frequency identification (RFID) transmitter but has a radar cross section and reflectivity sufficient for reflected RF pulses to be detected by a reference RF transceiver. Generally, objects with lower RF reflectivity must be larger to be detected and objects with smaller objects having higher RF reflectivity being detectable. For example, a passive object may be an adult human or a robotic vehicle.

FIG. 1 illustrates one embodiment of an UWB radar system comprising four reference UWB RF transceiver devices (10) labeled A, B, C, and D surrounding a monitored area (12) within which a passive object (14) may be tracked, mapped in a radar image, and/or characterised. The transceivers (10) communicate with a computing device (16), which may communicate with a display device (18).

The RF transceiver devices (10) may be of the type designed to track active RF tags and emit UWB pulses of the same type as used for tracking of active RF tags. The size and shape of the monitored area (12) is determined by the number and placement of transceivers (10) and is located within an area surrounded by the transceivers (10). The number of transceivers (10) may be varied with the number being preferably at least three and more preferably at least four. The placement of more transceivers (10) and/or the closer spacing of transceivers (10) provides higher confidence, lower artifact response, and/or higher resolution. Spacing between transceivers is preferably less than about 50 meters. For applications in which the inclusion of monitoring RF tags is not desired, the RF transceivers (10) may be configured to produce pulses having preamble sequences and payloads smaller than those used for active tag-based monitoring systems.

Figure 3:
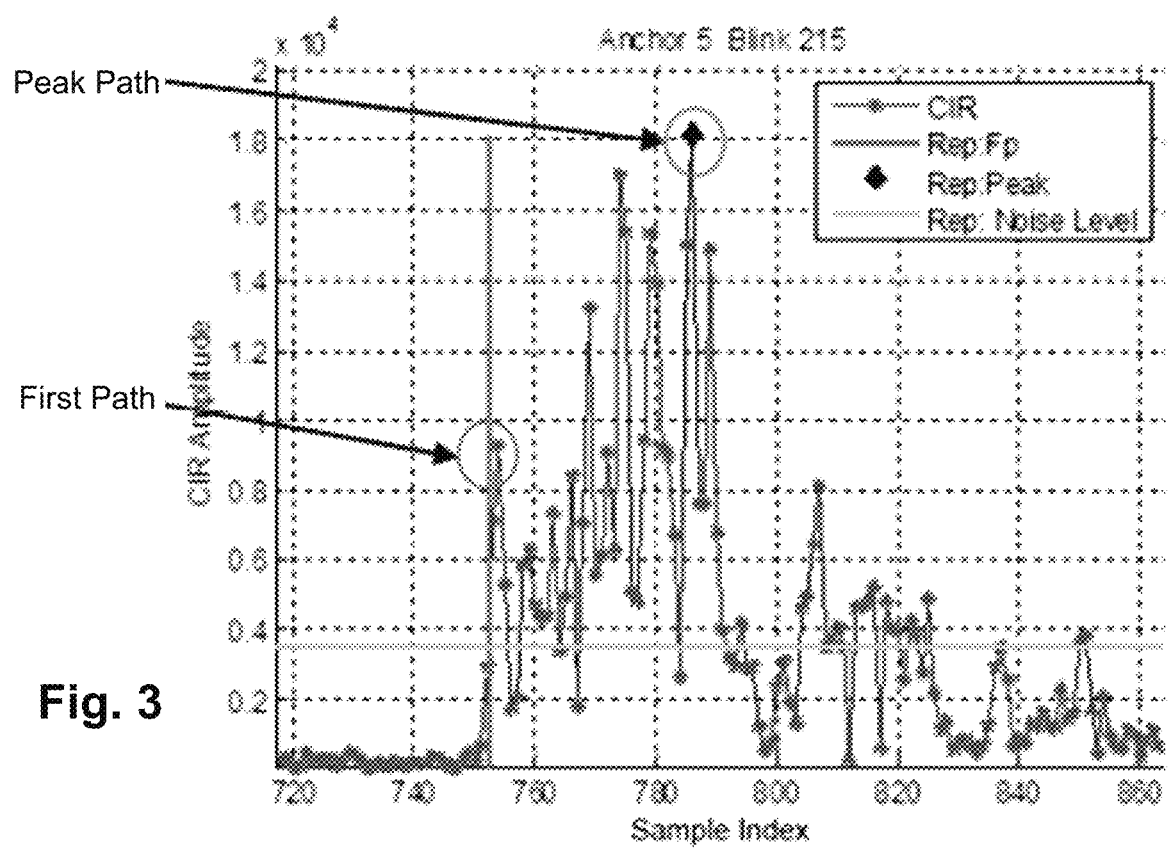
FIG. 3 is a graph that visually illustrates channel impulse response data where the peaks highlighted in the graph represent delayed reflections from tracked objects in a monitored area.
Figure 4:
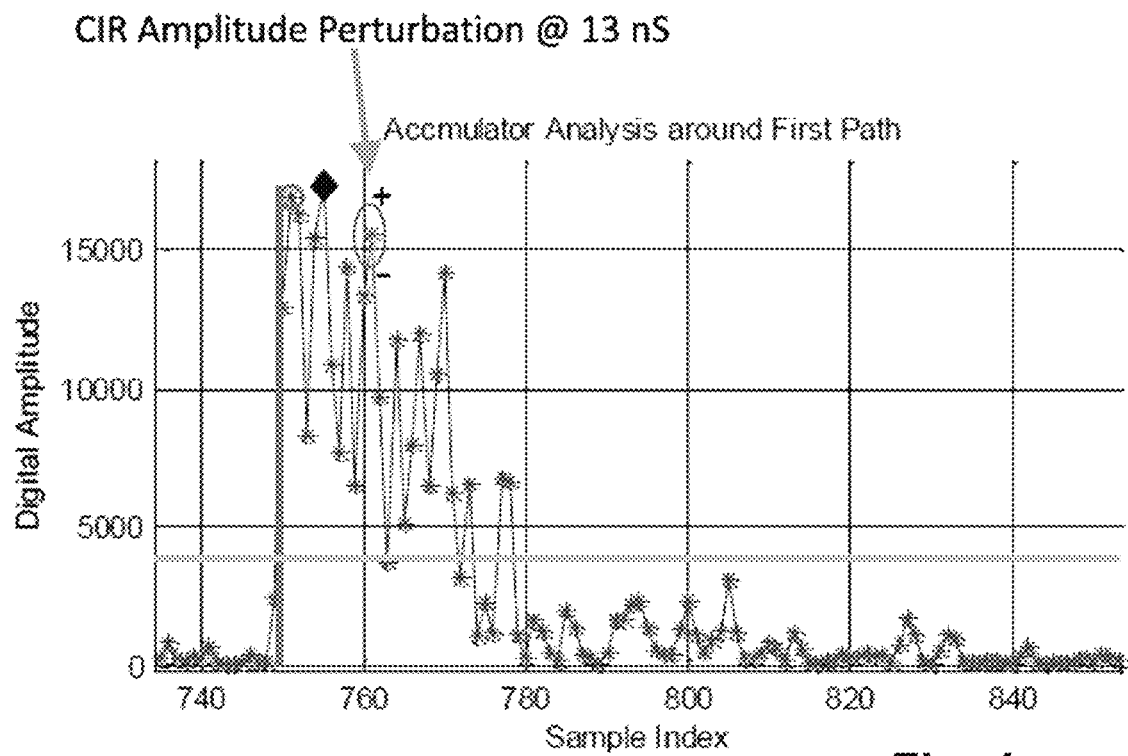
FIG. 4 is a graph that visually illustrates channel impulse response data where an amplitude perturbation at a time offset corresponding to the total added ray path from one of the RF amplification devices in FIG. 1 to a passive object in the monitored area.

For the embodiment shown in FIG. 1, the RF transceiver devices (10) transmit data packets comprised of UWB RF pulses that reflect off of objects in accordance to the objects' radar cross section. The RF transceiver devices (10) operate in pairs with one of the pair acting as an emitter of a data packet and the other of the pair acting as a receiver. The reflected pulses are received and recorded by the receiving device as channel impulse response (CIR) data (FIGS. 3 and 4). The channel impulse response data provides a measurement of the CIR resulting from the pulses transmitted by the other of the RF transceiver device pair. As explained in further detail below, the CIR data is recorded and then transmitted by the RF transceiver device (10) to a computing device (16) (e.g., a server), which implements a tracking algorithm and/or a radar imaging algorithm to identify, track or classify the passive object or to generate a radar image of the passive object.

Each of the RF transceiver devices (10) is positioned at a particular location. For example, RF transceiver A is placed at a cartesian coordinate location designated (xa,ya,za), RF transceiver B is placed at a coordinate location (xb,yb,zb), RF transceiver C is placed at coordinate location (xc,yc,zc), and RF transceiver D is placed at coordinate location (xd,yd,zd). The area between the four coordinates is the area monitored (12) by the RF transceiver devices (10). By providing several RF transceiver devices (10) at different locations along the perimeter of the monitored area (12), the RF transceiver devices (10) provide geometric diversity making it easier to track a passive object (14) and to generate a radar image with the CIR data.

Each RF transceiver (10) transmits a data packet comprised of RF pulses and receives a data packet. The reception of the data packet is used as a mechanism to measure CIR data resulting from emitted RF pulses of the packet, including those that reflect off objects in the environment. Reflected RF pulses are received by at least one other RF transceiver device, which generates and records reflected CIR data from the reflected pulses. The CIR data is transmitted from the receiving transceiver (10) to a computing device (16) which utilizes the CIR data from each of the RF transceiver devices over time to track the passive object (14) and/or form a radar image of the passive object. A preamble signal code contained in a series UWB pulses is used identify CIR data from reflected pulses, determine the time taken for reflected pulses to reach the transceiver, and calculate the distance from an emitting transceiver to a reflecting object and to the receiving transceiver, a path referred to as a ray.

In the embodiment shown in FIG. 1, a channel is defined as the path an RF signal may take as it is transmitted from one RF device and received by another RF device. This includes the summation of the direct path between the RF devices and all reflected paths the signal may take between the RF devices, over time. Thus, there are six channels between the RF transceiver devices shown in FIG. 1: between A and B, A and C, A and D, B and C, B and D and between C and D. There are two possible directions of travel between each pair of transceivers (10) which may be used, doubling the number of channels if directionality is considered.

The RF transceiver device A transmits pulses and each of the RF transceiver devices B, C, D record CIR data measuring the respective channel impulse responses along the respective channels between the RF transceiver device A and the RF transceiver devices B, C, D. The RF transceiver device B transmits pulses and each of the RF transceiver devices A, C, D record CIR data measuring the respective channel impulse responses along the respective channels between the RF transceiver device B and the RF transceiver devices A, C, D. The RF transceiver device C transmits pulses and each of the RF transceiver devices A, B, D record CIR data measuring the respective channel impulse responses along the respective channels between the RF transceiver device C and the RF transceiver devices A, B, D. The RF transceiver device D transmits pulses and each of the RF transceiver devices A, B, C record CIR data measuring the respective channel impulse responses along the respective channels between the RF transceiver device D and the RF transceiver devices A, B, C.

The RF transceiver devices (10) may have any known and suitable arrangement. For example, each of the RF transceiver devices may include one or more antennas, RF front end circuitry, one or more RF transceiver chains, baseband circuitry, one or more micro controllers, and a networking interface. The one or more micro controllers may be provided so as to receive and processes external commands and further so as to perform high level RF data applications. Data registers or memory may also be provided so as to buffer the channel impulse response data that is generated by the RF transceiver device throughout a measurement time interval. In one example, the RF transceiver device includes a Decawave® chip, which comprises RF front end circuitry, RF transceiver chains, and baseband circuitry. In one specific embodiment, the Decawave® chip is the DWM1000 module, which is configured to operate in accordance with the 2016 version of the IEEE 802.15.4 standard.

The network interface may include one or more network interface components that allow the RF transceiver device to communicate with the computing device. The network interface may communicate with the computing device through any known wireless technology (any interface that communicates in accordance with IEEE 802.11 standards, such as WiFi, 3G, LTE, IoT, Bluetooth®, and/or the like) or through more traditional wired computer network technology, such as TCP/IP technology, ethernet, USB, SPI, and/or the like.

According to a method for monitoring specifically a passive object (14) in a monitored area, the RF transceiver devices (10) shown in FIG. 1 do not operate as an RF tag reader nor as an active RF tag. Instead, a number of RF transceiver devices (10) transmit RF signals comprising preamble codes, which are reflected off objects in the environment including potential passive targets of interest. Each RF transceiver device (10) is further configured, when receiving packets, to record CIR data that measures the CIR resulting from the RF signals transmitted by the other RF transceiver devices (10). Each of the RF transceiver devices (10) may alternately transmit the RF signal with the preamble code or receive packets and record the CIR data resulting from the RF signals of the other RF transceiver devices (10) throughout some time interval. The CIR data is sent by the RF transceiver devices (10) to the computing device (16).

In preferred embodiments, the computing device (16) comprises a graphics card. In one preferred implementation, the computing device (10) is a server that receives CIR data from each of the RF transceiver devices (10). The computing device (16) is configured to detect and measure changes in the channel impulse responses as a function of time, as determined from the CIR data transmitted from each RF transceiver device (10) over the time interval, to track passive objects or to provide a radar image, such as a 3D radar image of the passive objects. For example, to track passive objects (14), the computing device (16) may detect perturbations in the channel impulse responses that appear at a time delay that corresponds with a distance indicated by the time delay.

While data packets normally comprise preamble codes making the preamble codes convenient for practicing the presently described method and using the presently described system, it may be possible to use other types coded sequences in place of preamble codes.

The computing device (16) may be a processor controlled device, such as, by way of example, a personal computer, a workstation, a server, a client, a minicomputer, a main-frame computer, a laptop computer, or a network of one or more individual computers, mobile computers, portable computers, handheld computers, palm top computers, or any combination thereof. The computing device (16) may be a uniprocessor or multiprocessor machine. Accordingly, a computing device may include one or more processors. Examples of processors include sequential state machines, microprocessors, microcontrollers, graphics processing units (CPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, discrete hardware circuits, and other suitable hardware configured to perform the various functionality described throughout this disclosure. Additionally, the computing device may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, optical memory storage, electronic networks, and/or other devices or other technologies to transmit or store electronic content such as programs and data.

In particular, the one or more memories may store computer executable instructions that, when executed by the one or more processors, cause the one or more processors to implement calculations for tracking or radar imaging as discussed herein. The one or more processors may be operably associated with the one or more memories so that the computer executable instructions can be provided to the one or more processors for execution. For example, the one or more processors may be operably associated to the one or more memories through one or more buses. Furthermore, the computing device may possess or may be operably associated with input devices (e.g., a keyboard, a keypad, controller, a mouse, a microphone, a touch screen, a sensor) and output devices such as (e.g., a computer screen, printer, or a speaker). The computing device may execute an appropriate operating system such as Linux, Unix, Microsoft® Windows® 95, Microsoft® Windows® 98, Microsoft® Windows® NT, Apple® MacOS®, IBM® OS/2®, and Palm® OS, and embedded operating systems such as Windows® CE or and the like. The computing device may advantageously be equipped with a network communication device such as a network interface card, a modem, or other network connection device suitable for connecting to one or more networks.

The computing device (16) may advantageously contain control logic, or program logic, or other substrate configuration representing data and instructions, which cause the computing device to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like. The programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer with hard-wired logic or programs stored in non-volatile memory, such as, by way of example, read-only memory (ROM).

Figure 2A:
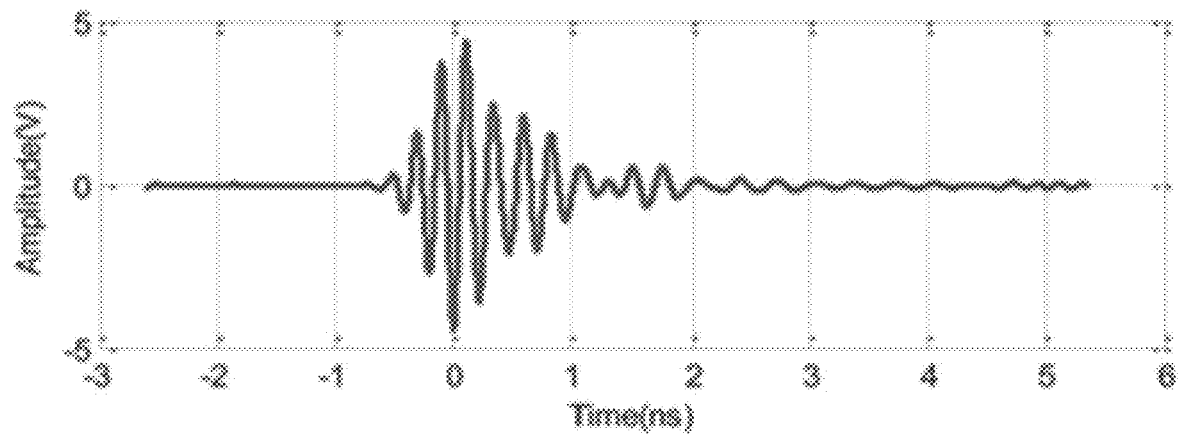
FIG. 2A is a graph showing the magnitude of the Fourier transform, or power spectrum density, of an exemplary pulse emitted from an UWB RF transceiver device shown in FIG. 1.
Figure 2B:
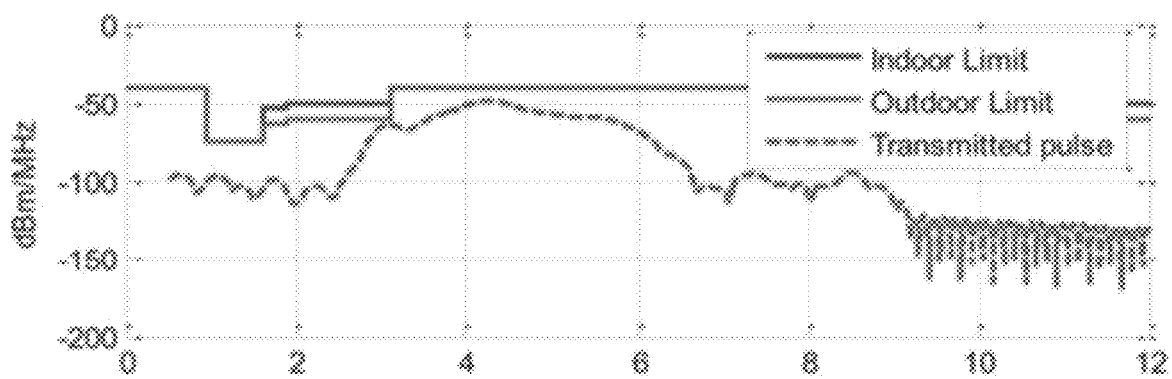
FIG. 2B is a graph showing the energy of an exemplary pulse that may be emitted by an UWB RF transceiver device shown in FIG. 1 relative to FCC regulatory limits.

FIG. 2A and FIG. 2B illustrate one example of the characteristics for one type of pulse that may be transmitted by the RF transceiver devices (10) in accordance with this disclosure. More specifically, FIG. 2A illustrates an exemplary pulse in the time domain showing the magnitude of the Fourier transform, or power spectrum density emitted from an UWB RF transceiver device (10). FIG. 2B illustrates an exemplary pulse in the frequency domain and showing the energy of the pulse relative to FCC regulatory limits. Each of the RF transceiver devices (10) may be configured to generate the RF signal with pulses each like the one described in FIG. 2A and FIG. 2B so the other RF transceiver devices (10) record the channel impulse response data measuring the CIR resulting from the pulses.

The pulse shown in FIGS. 2A and B are UWB radio pulses, which refers to a waveform that has short, low duty cycle pulses. In the implementation with widest bandwidth, the resulting waveform approaches one cycle per pulse at the center frequency (approximately 4.1 GHz in this example). In more narrow band embodiments, each pulse consists of a burst of cycles usually with some spectral shaping to control the bandwidth to meet desired properties such as out-of-band emissions or in-band spectral flatness, or time domain peak power or burst off time attenuation. One such waveform model that has the desired characteristics is the Gaussian monocycle as shown in FIGS. 2A and B. This waveform is representative of the transmitted pulse produced by a step function as emitted by an UWB antenna. While this example of the waveform has a center frequency of 4.1 GHz, other implementations of the pulse may have center frequencies anywhere from approximately 500 MHz-10.6 GHz, for example 3.1-10.6 GHz. The bandwidth of the pulse may be around 500 MHz or greater and is thus an ultrawideband pulse.

FIG. 3 is a visual graph of an example of CIR data recorded by a second of a pair of anchor, or reference, RF transceivers (10) in response to a pulse transmitted from a first transceiver of the pair. Each sample index represents approximately 1 ns time increment with the sample index being relative to a clock internal to the UWB transceiver (10). The peak labeled "first path" represents the direct line-of-sight path of the pulse from the first to the second transceiver (10). The distance between the first and second transceivers (10) may be determined from the time delay between the transmission of the pulse and receipt of the pulse by the second transceiver if the clocks of the two transceivers are snynchronised and the time of transmission is known. The peak labeled "peak path" represents a pulse signal that has reflected off of a passive object (14) in the monitored area (12). The length of a ray path from the first transceiver (10) to the second transceiver (10) may be calculated from the time delay between the transmission of the pulse and the detection of the reflected signal. If the distance between the first and second transceivers is known, the time delay between the detection of the first path and the peak path is sufficient to calculate the path length of the reflected ray. The number of reflections may be greater or fewer than the number shown in the figure, depending on the environment within the monitored area (12). A number of passive objects may be detected, tracked, and/or mapped on a radar image. The number of peaks in the CIR data may be reduced by eliminating those having an amplitude below a noise threshold, or "noise level" in the figure. Time delays representing distances outside the monitored area are, of course, not used.

FIG. 4 is a visual graph illustrating a peak corresponding to a particular passive object (14) resulting in a total added ray path length of 13 feet when compared to the direct, linear distance between the two transceivers. The reflection from the object is arrives at the second transceiver (10) 13 ns after the first path peak and is identified as "CIR Amplitude Perturbation @ 13 ns." Each sample index represents approximately 1 ns time increment. A tracked object will introduce an amplitude perturbation at a time offset corresponding to the distance of a total added ray path from the first RF transceiver device (10) emitting the pulse reflecting from the passive object. In this example, the perturbation is generated with a time offset of 13 ns, which can thus be used as a distance measurement. Using these distance measurements from each of the RF transceiver devices, the computing device can use the CIR data to track a passive object. Additionally, these perturbations can be used to create a 3D radar image.

Figure 5:
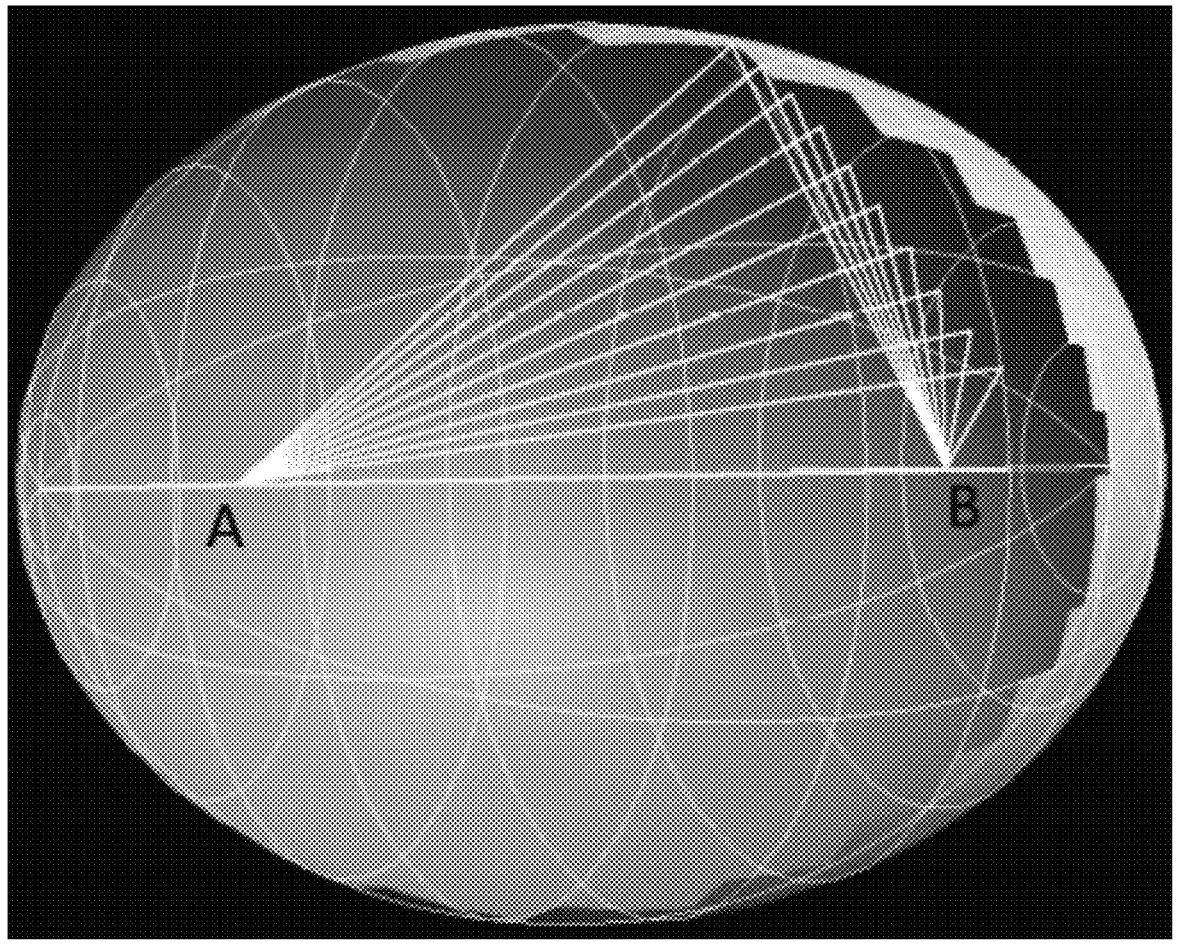
FIG. 5 is a visual graph that depicts ray paths for a reflected pulse, where the pulse is used to generate the channel impulse response data between a pair of the RF transceiver devices.

FIG. 5 is a visual graph depicting multiple possible ray paths for a pulse emitted by transceiver A, reflecting from a passive object and received by transceiver B to generate the corresponding CIR data. All of the rays have the same total ray path length, which means that the reflecting surface lies somewhere on the ellipsoid surface shown in the figure. In a method for tracking a passive object in a monitored area, a 3D radar image may be formed using CIR perturbations from each pair of RF transceiver devices (10) and comprising accumulating the perturbations and mapped mapping them into voxels. For a system having four transceivers, there are six pairs of transceivers (10).

Loci of a CIR perturbation time offset may be used to create an elliptical volume that is surface aligned with the line of sight of the pair of RF transceiver devices (in this example, RF transceiver device A and the RF transceiver device B), or Fresnel zone as shown in FIG. 5. The perturbations may be mapped to a set of concentric ellipsoid surfaces or directly to their overlapping 3D solution space voxels. Solution space voxels with the most accumulated perturbation correlate with the object location.

Maps showing the locations of passive objects may be static or dynamic. A map may be generated that shows all reflecting, passive objects, or a map may be generated that shows only moving objects. Changes in the channel impulse responses captured at successive moments in time may be used to track the movement of passive objects in the monitored area (12). Moving objects result in a distribution of CIR data peak amplitude over time. In a method for tracking a passive object, it may be desired to employ a computational algorithm that screens out static objects, which result in CIR data peaks that remain constant over time. Eliminating these peaks from further processing simplifies the tracking moving objects.

Figure 6:
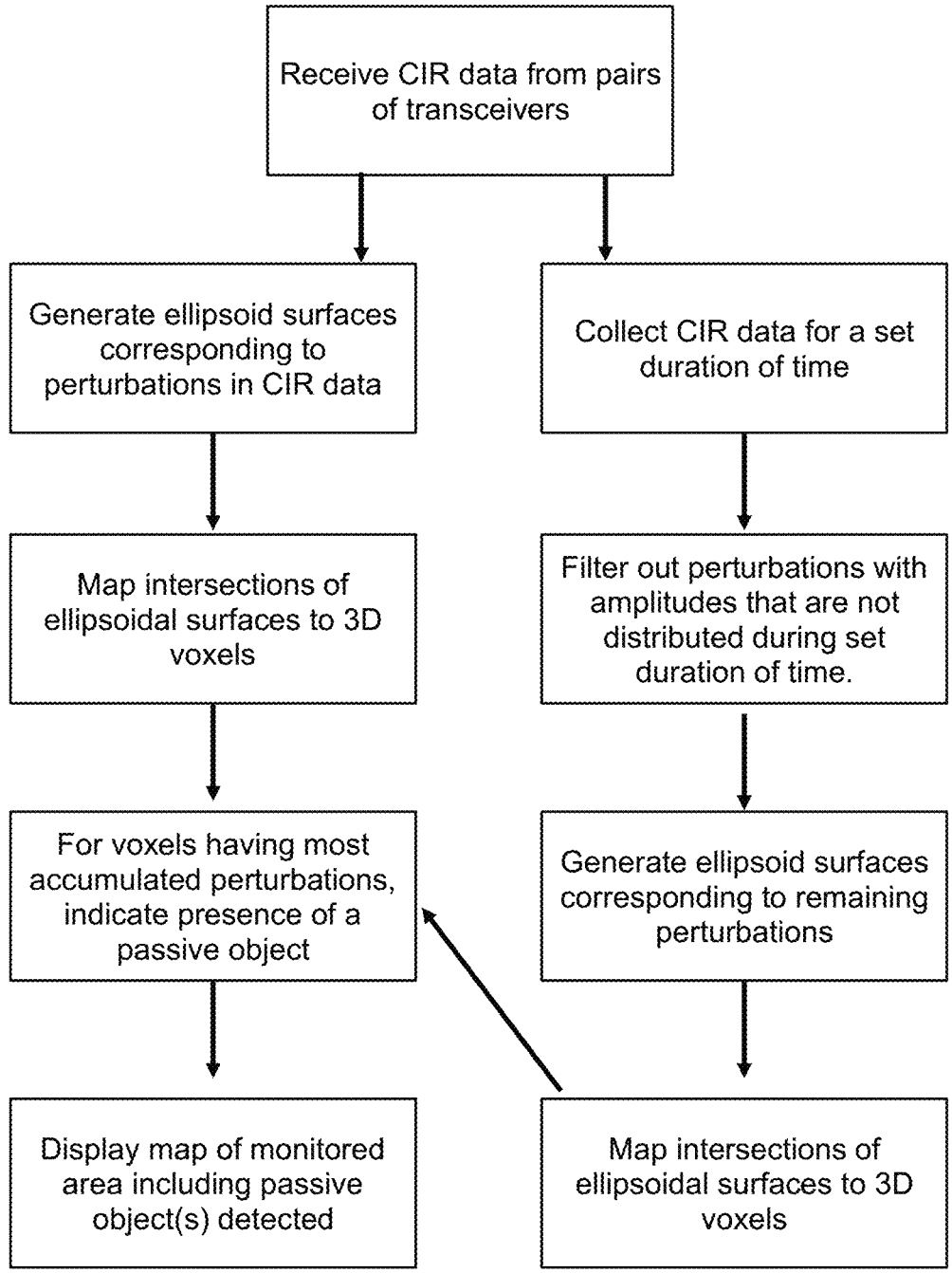
FIG. 6 is a flowchart of steps for two embodiments of the presently described method.

FIG. 6, is a flow chart showing two embodiments of a method steps performed by a computing device (16) using concentric ellipsoid surfaces to produce a radar map showing a passive object (14) in a monitored area (12). The computing device (16) comprises programming instructing the computing device to receive CIR data from each of the pairs of RF transceivers (10) active in the system. The pathway to the left does not select for CIR data representing moving passive objects or filtering out static passive objects. After receiving the CIR data, ellipsoid surfaces are generated corresponding to perturbations in the CIR data indicating reflections from passive objects in the monitored area. These surfaces may be mapped into voxels of a virtual 3D space and the intersections of surfaces located in the voxels or the locations of intersections may calculated and mapped into the voxels of a 3D space. The voxels having the most accumulated perturbations are identified as containing a passive object (14). The 3D map showing the position of the passive object (14) may be displayed on a display (18).

The pathway to the right in FIG. 6 selects for CIR data representing moving passive objects and/or filters out static passive objects. After receiving the CIR data over a set period of time, perturbations with amplitudes that are not distributed during set duration of time may be filtered out. Alternatively or additionally, perturbations with amplitudes that are distributed during set duration of time may be selected. Ellipsoid surfaces are generated corresponding to the remaining and/or selected perturbations in the CIR data. These surfaces may be mapped into voxels of a virtual 3D space and the intersections of surfaces located in the voxels or the locations of intersections may calculated and mapped into the voxels of a 3D space. The voxels having the most accumulated perturbations are identified as containing a passive object (14). The 3D map showing the time dependent position of the passive object (14) may be displayed on a display (18).

To form a 3D radar image, perturbations between each pair of RF transceiver devices are accumulated to mapped voxels. As can be seen from the figures, the set of concentric ellipsoid surfaces results in 3D solutions even if all of the transceivers (10) are positioned in the same plane. The method steps may be considered steps in an algorithm for determining and/or tracking the position of a passive object from which pulses are reflected. A program comprising instructions for performing the algorithm may comprise a scalar field solver and optionally a Rician statistical model or a Rayleigh or Nakagami statistical model providing confidence values for the presence of a reflecting surface in a voxel.

If desired, a 3D space may be collapsed into a 2D representation by integrating perturbations along one axis, for example the vertical or z axis. This may be advantageous when a passive object is asymmetrical with the object being longer in one axis than another. An example of this may be a person walking through a monitored area (12). Of course the system and method may be used to locate and/or track any number of passive objects (14) rather than a single passive object.

The invention claimed is:

1. A system for locating and/or tracking a passive object in a monitored area, said system comprising:
   at least three ultra wide band (UWB) transceivers designed to track active radio frequency tags and a computing device in communication said at least three UWB transceivers
   wherein:
   the at least three UWB transceivers are configured to form at least two distinct pairs of UWB transceivers with each pair comprising a first UWB transceiver and a second UWB transceiver;
   each first UWB transceiver in each pair is configured to transmit UWB pulses comprising a preamble code to each second UWB transceiver;
   each second UWB transceiver in each pair is configured to receive the transmitted direct line of sight UWB pulses from each first UWB transceiver and UWB pulses reflected from the passive object in the monitored area;
   each second UWB transceiver in each pair is configured to store channel impulse response (CIR) data obtained from both the direct line of sight pulses and the pulses reflected from the passive object and to transfer stored CIR data to the computing device;
   the computing device comprises coded instructions directing the computing device to receive the CIR data transferred from each second UWB transceiver and process said CIR by using said preamble code to identify said CIR data from reflected pulses and using a time delay between the time of flight of said preamble code received by direct line of sight and the time of flight of reflected pulses to calculate a distance from the first UWB transceiver to the passive object and to the second UWB transceiver; and
   the computing device comprises coded instructions for implementing a tracking algorithm and/or a radar imaging algorithm to identify, track or classify the passive object or to generate a radar image of the passive object.

2. The system of claim 1, wherein the computing device comprises coded instructions directing the computing device to create an elliptical volume that is surface aligned with the line of sight of each pair of UWB transceivers and to map perturbations in the received CIR data to a set of concentric ellipsoid surfaces within the elliptical volume.

3. The system of claim 1, and further comprising a display in communication with the computing device and configured to display the location and/or track of the passive object.

4. A method for locating and/or or tracking a passive object within a monitored area using a plurality of UWB transceivers, said method comprising:
   in a computing device, processing channel impulse response (CIR) data from at least two receiving UWB transceivers of at least two channel pairs of UWB transceivers wherein said processing comprises:
   using time delays between the times of flight of a preamble code received via direct line of sight for each of the at least two receiving UWB transceivers and the time of flight of preamble code pulses reflected from the passive object to generate a set of concentric ellipsoid surfaces aligned with the line of sight of the at least two pairs of UWB transceivers based on the total ray lengths of the reflected preamble pulses;

mapping the ellipsoid surfaces onto 3D solution space voxels; and correlating the location and/or path of the passive object with solution space voxels having the most accumulated perturbation.

5. A non-transitory computer-readable storage media comprising code comprising software for implementing the method of claim 4.

6. The system of claim 3, wherein the computing device is a server comprising a graphics card and is configured to provide a 3D radar image of the passive object on said display.

7. The system of claim 1, wherein the at least three UWB transceivers produce pulses having preamble sequences and payloads smaller than those used for active tag-based monitoring systems.

8. The system of claim 1, wherein center frequencies for the at least three UWB transceivers is in a range of 3.1 to 10.6 GHz.

9. The method of claim 4, wherein the at least two channel pairs of UWB transceivers each comprises a first transceiver and a second transceiver and a distance between the first and second transceivers is determined from the time delay between the transmission of a pulse by the first transceiver and receipt of the pulse by the second transceiver with clocks of the first and second transceivers snynchronised at the time of the transmission.

10. The method of claim 9, further comprising using a CIR data perturbation time offset to create an elliptical volume that is surfaced aligned with the line of sight of the first transceiver and the second transceiver of each of said at least two channel pairs of UWB transceivers and mapping the CIR data perturbations to a set of ellipsoid surfaces.

11. The method of claim 4, further comprising forming a 3D radar image using CIR data perturbations from said at least two channel pairs of UWB transceivers wherein said forming a 3D radar image comprises accumulating the perturbations and mapping the perturbations into voxels.

12. The method of claim 4, further comprising generating a map showing a passive object only if it is moving, wherein said generating a map comprises employing a computational algorithm that screens out static objects.

13. The method of claim 4, further comprising reducing the number of peaks in CIR data by eliminating peaks having an amplitude below a noise threshold.

14. The method of claim 4, further comprising collapsing the 3D solution space into a 2D representation.

* * * * *